(12) United States Patent
Kube (10) Patent No.: US 11,862,422 B2
(45) Date of Patent: Jan. 2, 2024

(54) ELECTRICAL FUSE, METHOD FOR OPERATING AN ELECTRICAL FUSE, AND ELECTRICAL TRACTION NETWORK

(71) Applicant: Volkswagen Aktiengesellschaft, Wolfsburg (DE)

(72) Inventor: Roland Kube, Schwülper (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 333 days.

(21) Appl. No.: 17/441,629

(22) PCT Filed: Mar. 19, 2020

(86) PCT No.: PCT/EP2020/057676
§ 371 (c)(1),
(2) Date: Sep. 21, 2021

(87) PCT Pub. No.: WO2020/193375
PCT Pub. Date: Oct. 1, 2020

(65) Prior Publication Data
US 2022/0148832 A1 May 12, 2022

(30) Foreign Application Priority Data
Mar. 25, 2019 (DE) .......... 102019204033.0

(51) Int. Cl.
*H01H 39/00* (2006.01)
*B60L 3/04* (2006.01)
*B60R 16/023* (2006.01)

(52) U.S. Cl.
CPC ............ *H01H 39/006* (2013.01); *B60L 3/04* (2013.01); *B60R 16/0232* (2013.01)

(58) Field of Classification Search
CPC ............... H01H 39/006; H01H 39/00; H01H 2039/008; B60L 3/04; B60R 16/0232
See application file for complete search history.

(56) References Cited

U.S. PATENT DOCUMENTS 3,958,206 A 5/1976 Klint
5,957,988 A * 9/1999 Osajda .................... F42D 1/045
701/45

(Continued)

FOREIGN PATENT DOCUMENTS

CN 2878953 Y 3/2007
CN 203300911 U 11/2013
(Continued)

OTHER PUBLICATIONS

PCT/EP2020/057676. International Search Report (dated Jun. 25, 2020).

(Continued)

*Primary Examiner* — Jacob R Crum
(74) *Attorney, Agent, or Firm* — Peter Zura; LOZA & LOZA, LLP (57) ABSTRACT

An electrical fuse that includes an electro-pyrotechnic igniter, a separating element, which can be moved by the electro-pyrotechnic igniter, and a busbar with a separating section. A separating element is arranged so that it can move after the electro-pyrotechnic igniter is triggered to separate the busbar. At least one inductive coupler is arranged on the busbar or a high-voltage line. The electrical fuse further includes a control circuit for controlling an ignition current for triggering the electro-pyrotechnic igniter. The control circuit includes at least one semiconductor switch for switching the ignition current provided, at least one capacitor, connected to a control input of the semiconductor switch, and a diode coupled on one side to the at least one inductive coupler and on the other side to the capacitor and a control input of the semiconductor switch.

18 Claims, 5 Drawing Sheets

(56) References Cited

U.S. PATENT DOCUMENTS

| | | | |
|---|---|---|---|
| 2010/0073832 A1 | 3/2010 | Chung et al. | |
| 2013/0009745 A1* | 1/2013 | Hentschel | H01H 39/006 337/401 |
| 2015/0288202 A1 | 10/2015 | Kim | |
| 2018/0248354 A1 | 8/2018 | Sugisawa | |
| 2018/0331571 A1 | 11/2018 | Smit | |
| 2019/0280474 A1* | 9/2019 | Eichler | H02H 7/00 |
| 2019/0363532 A1* | 11/2019 | von zur Muehlen | H01H 85/38 |

FOREIGN PATENT DOCUMENTS

| | | |
|---|---|---|
| CN | 104410055 A | 3/2015 |
| CN | 204230875 U | 3/2015 |
| CN | 105121837 A | 12/2015 |
| CN | 108116232 A | 6/2018 |
| CN | 108933429 A | 12/2018 |
| DE | 2060990 A1 | 12/1970 |
| DE | 19503809 A1 | 8/1996 |
| DE | 10334197 A1 | 2/2005 |
| DE | 102012214835 A1 | 2/2014 |
| DE | 102017203851 A1 | 5/2018 |
| EP | 3327745 A1 | 5/2018 |
| GB | 1324880 A1 | 7/1973 |

OTHER PUBLICATIONS

Corresponding Chinese Patent Application No. 202080030764.9. Office Action (dated Sep. 16, 2023).

* cited by examiner

ELECTRICAL FUSE, METHOD FOR OPERATING AN ELECTRICAL FUSE, AND ELECTRICAL TRACTION NETWORK

CROSS REFERENCE TO RELATED APPLICATION

The present application claims priority to International Patent App. No. PCT/EP2020/057676 to Roland Kube, titled "Electrical Fuse, Method for Operating An Electrical Fuse, And Electrical Traction Network", filed Mar. 19, 2020, which claims priority to German Patent App. No 10 2019 204 033.0, filed Mar. 25, 2019, the contents of each being incorporated by reference in their entirety herein.

FIELD OF TECHNOLOGY

The present disclosure relates to an electrical fuse and a method for operating an electrical fuse. The present disclosure also relates to a traction power network.

BACKGROUND

High voltage batteries for motor vehicles contain not only battery cells, but also a connection unit ("battery junction box") that makes it possible to actively connect a high voltage in the battery to the vehicle traction network, or separate it therefrom. As a result, it is possible to apply high voltage to the vehicle traction network only while the vehicle is under way, and to separate it therefrom when the vehicle is parked. Normally, the junction box has two electromechanical breakers, via which a positive path and a negative path can be shut on or off.

While the battery is in operation (e.g., when under way or while charging the batteries), an overload to the battery cells and the electromechanical breakers is prevented in that a maximum current is limited, wherein current boundary conditions are taken into account, such that the breakers are opened after a predefined plausibility check. This prevents damage to the battery cells.

Furthermore, a current capacity for the breakers should not be exceeded. At currents above this capacity, heat caused by the current flow will result in a welding of the contacts in the breakers. To prevent this, the breakers must be opened prior to reaching the current capacity.

In the event of a short circuit, the current exceeds the capacity of the breakers so quickly that it must be expected that the contacts will become welded. For this reason, an additional melt fuse is needed which then interrupts the circuit, thus protecting both the battery cells and the high voltage power supply from an overload.

The fuse layout must take into account the aging of the fuses due to the pronounced current peaks occurring while the vehicle is in operation. Because minimum triggering levels for the fuses decrease with age, it is necessary to use fuses that are large enough that they are not triggered by current peaks that occur within the normal operating current range, even when they are older. When they are new, these large fuses have a higher minimum triggering level, such that the cross section of the wiring for the high voltage power supply connected thereto must also be correspondingly large.

A so-called "pyro-fuse" is also known of for protecting 12V batteries in motor vehicles. Such a pyro-fuse is sold by the company Autoliv, under the name "Pyro Safety Switch (PSS)". The "Pyro Safety Switch" is placed in the immediate proximity of the 12V battery, and in the case of an accident, interrupts the connection line between the 12V battery and a 12V generator, and/or a 12V power supply. A signal from an airbag control unit (ACU) is used, for example, as the signal for triggering this interruption. As soon as this signal becomes "active," the ACU generates a voltage of >10V at the control input for the "Pyro Safety Switch." In accordance with the internal resistance of the "Pyro Safety Switch," this results in a current>1.75 A, resulting in an explosion of a blasting charge in a detonator for the "Pyro Safety Switch" after no more than 0.5 ms, such that a piston-like separating element is placed in motion. After no more than 0.1 ms later, the piston-like separating element with a special lug designed for this comes in contact with a separating section of a busbar, and severs it. The busbar is subsequently severed, such that it can no longer conduct a current.

A pyrotechnical switch for a motor vehicle battery system and a battery are known from DE 10 2012 214 835A1, wherein the battery includes a shunt, which is integrated serially in a switching current path, a switch element, which integrated serially in the switching current path, and a pyrotechnical detonator that can be activated electrically, wherein a control output in an electronic circuit is connected to the detonator and a control input in the circuit is connected to the shunt. A method for activating a pyrotechnical switch is also described therein, which includes the steps: activating at least one control input in the in the electronic circuit with an electrical actual value, comparing the actual value with a predefinable limit value, activating the detonator if the actual value exceeds the limit value, and activating the switch element by the activated detonator, such that the supply current is interrupted, wherein the electronic circuit is buffered with an electrical charge storage device.

An electrical fuse, a method for operating an electrical fuse, and a traction power network are known from EP 3 327 745A1. The electrical fuse includes an electro-pyrotechnical detonator, a separating element that can be moved by the electro-pyrotechnical detonator, and a busbar with a separating section, wherein the moving separating element is placed in relation to the electro-pyrotechnical detonator and the separating section of the busbar such that the moving separating element moves after the electro-pyrotechnical detonator is triggered, thus separating the busbar at the separating section, wherein the electrical fuse has at least one triggering means that is configured to supply a detonating current necessary for triggering the electro-pyrotechnical detonator base on a current conducted over at least one section of the busbar, or its temporal change, when the current conducted over the at least one section of the busbar, or its temporal change, exceeds a limit value. The triggering means can include an induction loop located on the busbar.

A control circuit for indicating an abnormal state of the circuit is described in CN 203 300 911 U. An inductive current measurement for triggering a fuse is described in US 2018/0 331 571 A1. An SMA fuse (shape-memory alloy) for vehicles is known from DE 195 03 809 A1. This SMA fuse can advantageously replace a detonator.

An electro-pyrotechnical fuse is known from U.S. Pat. No. 3,958,206 A, which contains a current sensor and a battery for supplying the detonating current. A quicker triggering of the pyrotechnical fuse is obtained with the battery.

An electrical fuse for a traction power network is known from DE 10 2017 203 851 A1. This fuse includes an electro-pyrotechnical detonator, a separating element that can be moved by the electro-pyrotechnical detonator, and a busbar that has a separating section. The moving separating element is placed in relation to the electro-pyrotechnical detonator and the separating section of the busbar such that the moving separating element moves after the electro-pyrotechnical detonator is triggered, thus separating the busbar at the separating section. A current that is conducted over at least one section of the busbar, or its temporal change, is detected in order to trigger the electro-pyrotechnical detonator, which then causes the triggering via the detonating current when a limit value is exceeded.

SUMMARY

Aspects of the present disclosure are to create an electrical fuse and a method for operating an electrical fuse, with which the electro-pyrotechnical detonator can be reliably triggered. A further aspect of the present disclosure is to create an improved power traction network.

Certain aspects are achieved according to independent claims, found below. Advantageous embodiments of the present disclosure can also be derived from the dependent claims.

In some examples, an electrical fuse is disclosed that includes an electro-pyrotechnical detonator, a separating element that can be moved by means of the electro-pyrotechnical detonator, and a busbar that has a separating section, wherein the moving separating element is placed in relation to the electro-pyrotechnical detonator and the separating section in the busbar such that the moving separating element moves after triggering the electro-pyrotechnical detonator such that it can sever the busbar at the separating section, and at least one inductive coupler located on the busbar or a high voltage line. The electrical fuse also includes a control circuit for a detonation current for triggering the electro-pyrotechnical detonator, wherein the control circuit includes at least one semiconductor switch for switching the detonation current, at least one capacitor connection to a control input for the semiconductor switch, and a diode, wherein the diode is connected on one sided to the at least one inductive coupler, and on the other side to the capacitor and a control input for the semiconductor switch.

In some examples, a method is also disclosed for operating an electrical fuse, which includes the following steps: providing a detonation current for an electro-pyrotechnical detonator, triggering the electro-pyrotechnical detonator, moving a moving separating element by means of the triggered electro-pyrotechnical detonator, separating a separating section of a busbar by means of the moving separating element, wherein the detonation current provided for triggering the electro-pyrotechnical detonator is controlled by a semiconductor switch in a control circuit, wherein the semiconductor switch is activated by means of a capacitor in the control circuit at a control input for the semiconductor switch, and wherein the capacitor is charged via a diode by means of at least one inductive coupler located on the busbar or a high voltage line.

In some examples, a traction power network is also disclosed for a motor vehicle, comprising a high voltage power source and at least one high voltage component, wherein the at least one high voltage component is connected to the high voltage power source by at least one line, wherein an electrical fuse according to any of the embodiments described herein is placed in the at least one line.

The electrical fuse and method make it possible to reliably interrupt an electrical connection by means of the separating element, even with low maximum currents flowing over the busbar, such as those caused by a high voltage battery in the event of a short circuit at low temperatures. The control circuit is also extremely simple, and functions substantially passively, i.e., complex control circuits or complicated current measurements at the busbar or the high voltage line are not needed with the electrical fuse, in the method described herein.

Because of the control circuit, the at least one inductive coupler can be smaller, because only the semiconductor switch needs to be controlled, and the necessary inductance for this can be lower. This results in savings in terms of material costs and installation space.

If a stronger current flows over the busbar or high voltage line, an inductive current is induced by means of the at least one inductive coupler, which is charged via the diode in the capacitor. The capacitor is designed with regard to its capacitance such that it can provide an activation voltage or activation current at a control input on the semiconductor switch, such that the semiconductor switch can conduct current, and the detonation current can flow through the semiconductor switch to the detonator. The detonator is detonated by the detonation current, and the separating element severs the busbar by moving the separating element into the separating section of the busbar.

Because the input on the semiconductor switch is normally configured for high amperages, any power output during switching is negligible. The at least one inductive coupler can therefore be smaller, because only the semiconductor switch needs to be activated, and an inductance necessary for this can be smaller. This results in savings in terms of material costs and installation space.

The diode in the control circuit ensures that there are no oscillations in the oscillating circuit formed by the at least one inductive coupler and the capacitor, and the semiconductor does not return to its off state after it has been switched on.

The detonation current is provided, for example, using a 12V battery in a motor vehicle. The control circuit has an electrical connection for this. This detonation current can also be provided, however, by other means.

The semiconductor switch can be a transistor, for example, in the form of a metal-oxide-semiconductor field-effect transistor (MOSFET).

The electrical fuse and the method for protecting a high voltage battery (400V etc.) are preferably used in a motor vehicle, for example a motor vehicle that has a hybrid or electric drive. The electrical fuse and the method can also be used in principle to protect other vehicle batteries with other voltage levels (e.g., 48V or 850V) and other mechanisms.

For example, an inductance of the at least one inductive coupler is selected such that if a predefined current threshold value is exceeded on the busbar through a rapid increase in the current to this current threshold value, and the resulting change in current in the inductive coupler results in an electrical voltage that activates the semiconductor switch and switches the semiconductor switch on, thus conducting the detonation current.

In another example, an inductance of the at least one inductive coupler is selected on the basis of a minimum current and/or an increase to this minimum current provided by a high voltage power source and flowing over the busbar. For example, this is a minimum current, or increase to this minimum current flowing in the case of a malfunction, e.g., a current or increase to this current flowing at low temperatures from a high voltage batter in a motor vehicle in the case of a short circuit. Because a current flowing over the busbar is heavily dependent on an operating temperature for the high voltage battery, it must be ensured that even at low temperatures, e.g., −25° C., a current induced via the at least one inductive coupler is high enough to charge the capacitor sufficiently, and reliably trigger the detonation current. This takes place in that the at least one inductive coupler is selected on the basis of the minimum current or the increase to this minimum current. This minimum current then corresponds to the current flowing over the busbar at which the electrical fuse is triggered, or should be triggered. If, for example, the normal operating current in a high voltage battery is 300 A, the current can increase to between 6,000 A and 7,000 A in the case of a malfunction at room temperature (e.g., caused by a short circuit). This value drops to between 250 A and 450 A at, e.g., −25° C. The inductance is therefore selected on the basis of the current or increase to these currents at −25° C., such that the electrical fuse functions reliably at both low temperatures as well as higher temperatures.

In one embodiment, the electrical fuse includes a resistor connected in parallel to the capacitor. This resistor is configured such that the capacitor is continuously charged during normal operation, for example, when no increased current flows over the busbar, and no large changes in current can be detected. This is necessary to prevent a faulty triggering of the detonator resulting from a continuous charging of the capacitor by a current induced at least one inductive coupler during normal operation, e.g., due to a high frequency current pulse. The resistor must be selected such that it is large enough to prevent a quick drop in the control voltage at the capacitor caused by discharging the capacitor via the resistor in the case of a malfunction, such that the control voltage remains above a threshold voltage for the semiconductor switch at the control input in the semiconductor switch for a long enough time, and the detonation current remains long enough at the detonator that it is detonated. With the "Pyro Safety Switch" from AutoLiv, mentioned briefly above, the detonation current of >1.75 A must be applied for at least 0.5 milliseconds to the detonator to result in a detonation.

In another embodiment, the at least one inductive coupler includes at least one air coil. Because of the aforementioned large input resistor in the semiconductor switch, it is possible to use an air coil on the busbar to sufficiently charge the capacitor, and switch on the semiconductor switch. The air coil is particularly inexpensive, and has a low mass, or weight.

In one embodiment, the inductive coupler includes at least one ferrite ring core. The ferrite ring core encompasses the busbar. The ferrite ring core is advantageous because an inductive coupler with a ferrite ring core with the same inductance as the air coil has smaller dimensions. This results in a reduction in installation space.

In another embodiment, the electrical fuse forms a pyro-element in which the at least one inductive coupler and the control circuit are integrated. In this context, integrated means, for example, that the pyro-element produced in this manner forms a single, compact, integral module, or housing, for example. Because the control circuit has a simple structure, it can be integrated particularly easily with the inductive coupler, the electro-pyrotechnical detonator, and the separating element in a compact housing. Installation space can be reduced in this manner. Installation, maintenance, and replacement of the electrical fuse is also simplified by such a compact pyro-element.

In one embodiment, the electrical fuse includes a further inductive coupler and a further capacitor on the busbar, wherein the additional coupler and additional capacitor are selected and connected to one another and the semiconductor switch such that the additional capacitor can be charged via a current formed on the additional inductive coupler, and the detonation current necessary for triggering the electro-pyrotechnical detonator can be provided via the charged additional capacitor. As a result, there is no need for an external power source for the detonation current, and the electrical fuse can be operated fully autonomously. For example, there is no need for additional electrical supply lines for the electrical fuse in order to provide the detonation current. In normal operation, the additional capacitor is charged by means of the additional inductive coupler via a current obtained therein, and kept at a charged state, for example. There can also be other electrical components, e.g., an additional diode, which prevents discharging the additional capacitor due to pulsed currents flowing over the busbar.

In some examples, the detonation current may be provided by means of an additional inductive coupler on the busbar and an additional capacitor, wherein the additional inductive coupler and the additional capacitor are selected and connected to one another and the semiconductor switch such that the additional capacitor is charged via a current obtained on the additional inductive coupler, and the detonation current necessary for triggering the electro-pyrotechnical detonator is provided via the charged additional capacitor.

Further features of the present disclosure can be derived from the description of embodiments of the electrical fuse. The advantages of the embodiments of the method correspond to the advantages of the embodiments of the electrical fuse.

BRIEF DESCRIPTION OF THE DRAWINGS

The present disclosure shall be described in greater detail below on the basis of preferred exemplary embodiments and in reference to the figures. Therein.

DETAILED DESCRIPTION

Figure 1:
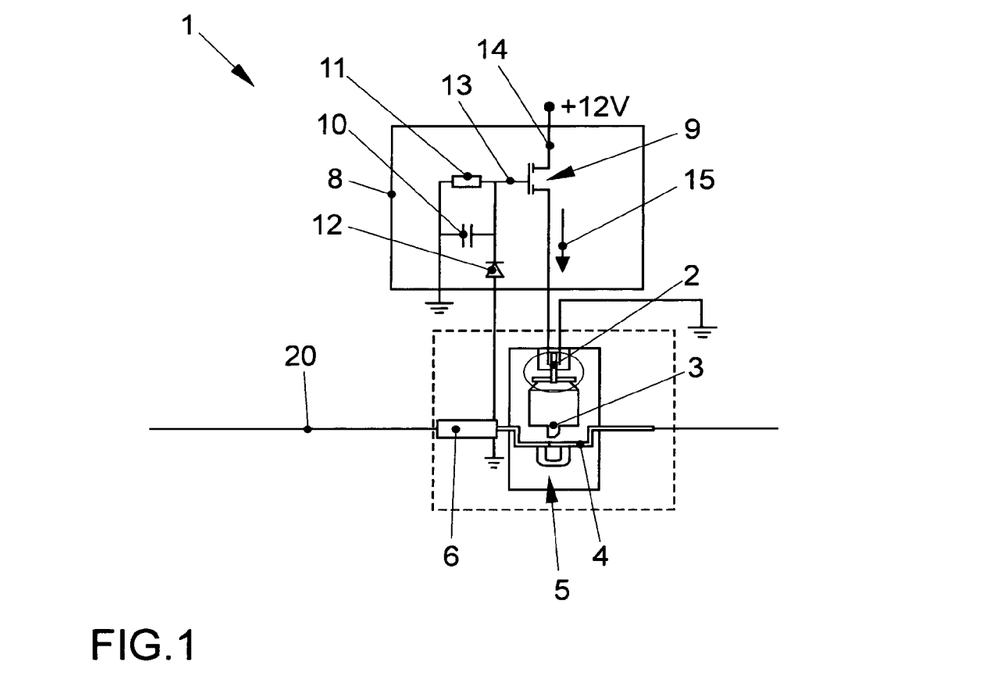
FIG. 1 shows a schematic illustration of an embodiment of the electrical fuse according to some aspects of the present disclosure.

A schematic illustration of an embodiment of the electrical fuse 1 is shown in FIG. 1. The electrical fuse 1 includes an electro-pyrotechnical detonator 2, a separating element 3 that can be moved by the electro-pyrotechnical detonator 2, a busbar 4 with a separating section 5, an inductive coupler 6 on the busbar 4, and a control circuit 8.

Alternatively, the inductive coupler 6 can also be placed on the high voltage line 20. The electrical fuse 1 includes a hollow or tunnel-like hole (not shown) for this, through which a section of the high voltage line 20 can be fed, which does not come in contact with the busbar 4. The inductive coupler 6 is then located at this hollow or tunnel-like hole.

The electrical fuse 1 is in a high voltage line 20, for example, connected to the busbar 4 via connection contacts, between a high voltage source (not shown) and a high voltage component (not shown).

The control circuit 8 includes a semiconductor switch 9 for switching the detonation current 15, a capacitor 10, a resistor 11 connected in parallel to the capacitor 10, and a diode 12. The diode 12 is connected to the inductive coupler 6 at the anode, and to the capacitor 10 and a control input 13 for the semiconductor switch 9 at the cathode.

The semiconductor switch 9 is a MOSFET, by way of example. The control input 13 is then a gate contact for the MOSFET, and the detonation current 15 conducted over source and drain contacts in the MOSFET.

The control circuit 8 also includes a voltage connection 14, via which a detonation current 15 can be supplied externally, e.g., from a 12V battery in a motor vehicle.

If the current in the busbar 4 increases to a higher value (a few thousand amperes), e.g., due to a short circuit at the high voltage line 20 connected thereto, an induction current is induced via the inductive coupler 6, which charges the capacitor 10 via the diode 12. The capacitor 10 can supply a control voltage or current to the control input 13 in the semiconductor switch 9 after this charging, such that the semiconductor switch 9 is switched on, and the detonation current 15 is applied to the detonator 2. The detonator 2 is detonated by the detonation current 15, and the separating element 3 severs the busbar 4 in the separating section 5 through the movement of the separating element 3.

The resistor 11 is configured such that the capacitor 10 is continuously charged in normal operation, i.e. when no increased current change can be distinguished, and only a normal operating current flows over the busbar 4. This is necessary for a constant charging of the capacitor 10 by a current induced in normal operation at least one inductive coupler 6, and preventing a faulty triggering of the detonator 2 as a result. The resistor 11 must be large enough, however, to prevent a rapid drop in the control voltage built up at the capacitor 10 caused by discharging the capacitor 10 via the resistor 11 in the case of a malfunction, such that the control voltage remains above a threshold voltage for the semiconductor switch 9 at the control input 13 in the semiconductor switch 9 for a long enough time, and the detonation current remains at the detonator 2 long enough to detonate it.

The diode 12 in the control circuit 8 ensures that no oscillations are formed in the oscillating circuit formed by the at least one inductive coupler 6 and the capacitor 10, and the semiconductor 9 is not switched back off after it is switched on.

The electrical fuse can be a pyro-element, in which the at least one inductive coupler 6 and the control circuit 8 are integrated. This results in a compact, integral module, for example, which can be easily placed in a high voltage line 20, without requiring contact to be established with numerous individual parts located therein.

Figure 2:
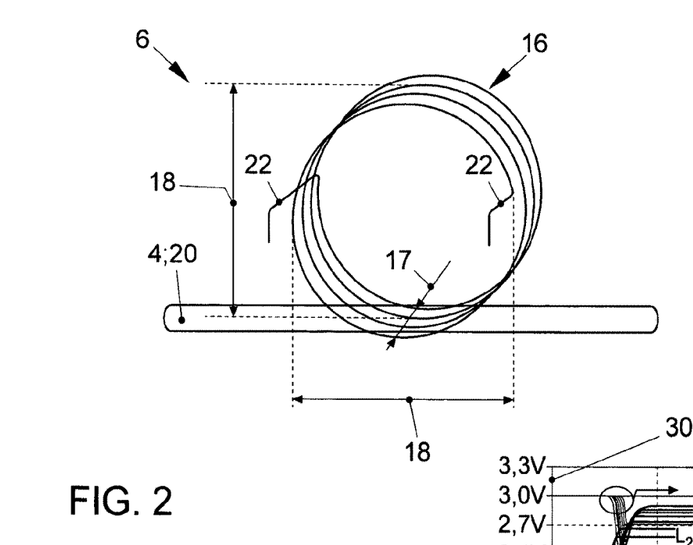
FIG. 2 shows a schematic illustration of an embodiment of the inductive coupler, comprising an air coil according to some aspects of the present disclosure.

A schematic illustration of an embodiment of the inductive couple 6 that has an air coil 16 is shown in FIG. 2. The air coil 16 has a (secondary) induction of 40 μH and a width 17 of 15 millimeters in an exemplary application case. With a diameter 18 of 30 millimeters, the air coil 16 spans an adequately long segment of the busbar 4, or high voltage line 20. Because the busbar 4, or high voltage line 20 normally has an inductance of 10 nH/cm, the (primary) inductance in the busbar 4 or high voltage line 20 is 30 nH for the air coil 16. This enables a sufficient charging of the capacitor (cf. FIG. 1) and the interconnection of the semiconductor switch in the control circuit by means of the capacitor charged through induction in the case of current changes that typically occur in the busbar 4 or high voltage line 20 after a short circuit (i.e. changes in the current to ca. 250-450 A at 25° C.). The air coil 16 is connected to the diode in the control circuit and the ground via contacts 22.

Figure 3:
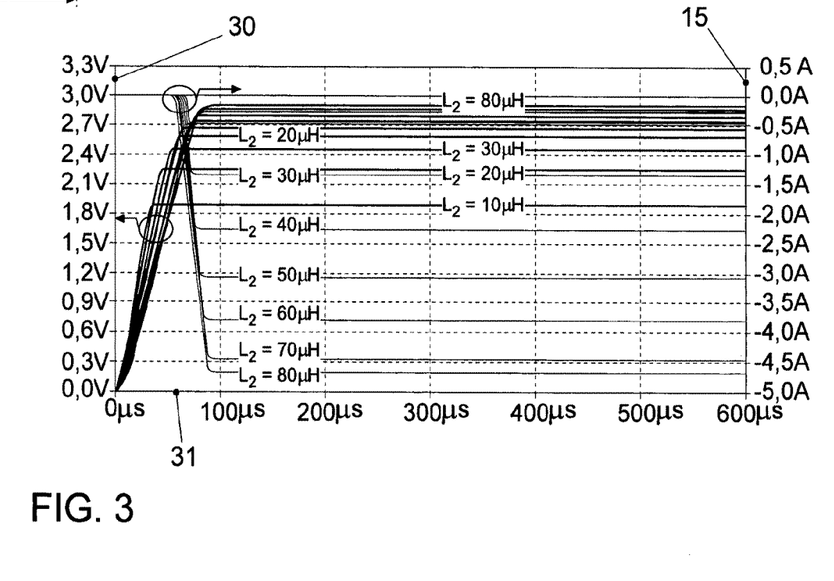
FIG. 3 shows a schematic illustration of a temporal curve of an activation voltage and a detonation current when using an inductive coupler with an air coil, according to some aspects of the present disclosure.

A schematic illustration of a temporal curve 13 of a control voltage 30 and a detonation voltage 15 when an inductive coupler with an air coil is used for different (secondary) inductances in the air coil is shown in FIG. 3 under some aspects of the present disclosure. This is based on an operating temperature for a high voltage battery connected to the busbar of −25° C. In the exemplary overview, a (primary) inductance of 30 nH in the busbar 4 or high voltage line 20 (cf. FIG. 2), and a coupling factor of k=0.26 is assumed. In this example, the capacitor 10 has a capacitance of 0.2 μF and the resistance is 1 MΩ. It can be seen in FIG. 3 that, as the control voltage 30 increases, a detonation current 15 corresponding to this control voltage 30 also increases. Assuming this is a typical electro-pyrotechnical detonator (e.g., the "Pyro Safety Switch" from AutoLiv), the detonator is triggered with a detonation current 15 that is >1.75 A, which must be applied for a period of >0.5 milliseconds. The curves show that a control voltage 30 of ca. 2.6V is sufficient for this. This is obtained, for example, by a (secondary) inductance in the air coil of 40 μH. In this case, the detonation current 15 increases to a value greater than the necessary 1.75 A. With these parameters, the electrical fuse can therefore also be triggered in the case of a malfunction at low temperatures (−25° C.) in the high voltage battery, when the current flowing through the busbar 4 or high voltage line 20 increases to 250-450 A.

Figure 4:
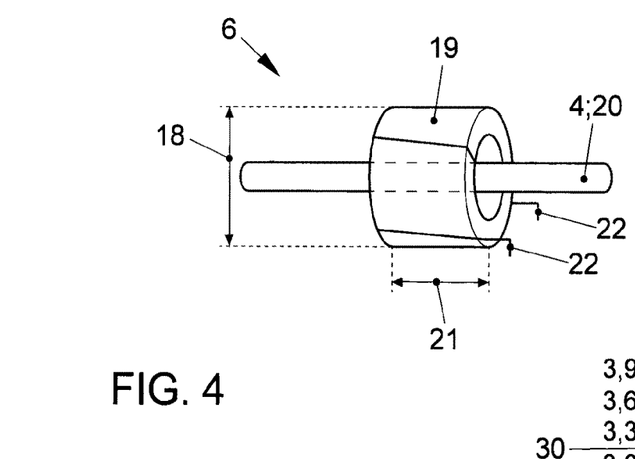
FIG. 4 shows a schematic illustration of an embodiment of the inductive coupler, comprising a ferrite ring core according to some aspects of the present disclosure.

FIG. 4 shows a schematic illustration of an embodiment of the inductive coupler 6 with a ferrite ring core 19. The ferrite ring core 19 has a diameter of 1.3 cm, and a length 21 of 1 cm. The ferrite ring core 19 and a coil encompassing it have a combined (secondary) inductance of 6 μH. Because the busbar 4 or high voltage line 20 normally has an inductance of 10 nH/cm, this results in a (primary) inductance for the busbar 4 or high voltage line 20 of 10 nH for the ferrite ring core 19. With a higher coupling factor of 0.71 in comparison with the air coil, this results in a sufficient charging of the capacitor and a switching on of the semiconductor switch in the control circuit by means of the capacitor charged through induction, when the currents flowing through the high voltage line 20 increase to ca. 250-450 A, as typically occurs with a short circuit. The ferrite ring core 19 is connected via contacts 22 to the diode in the control circuit and the ground.

Figure 5:
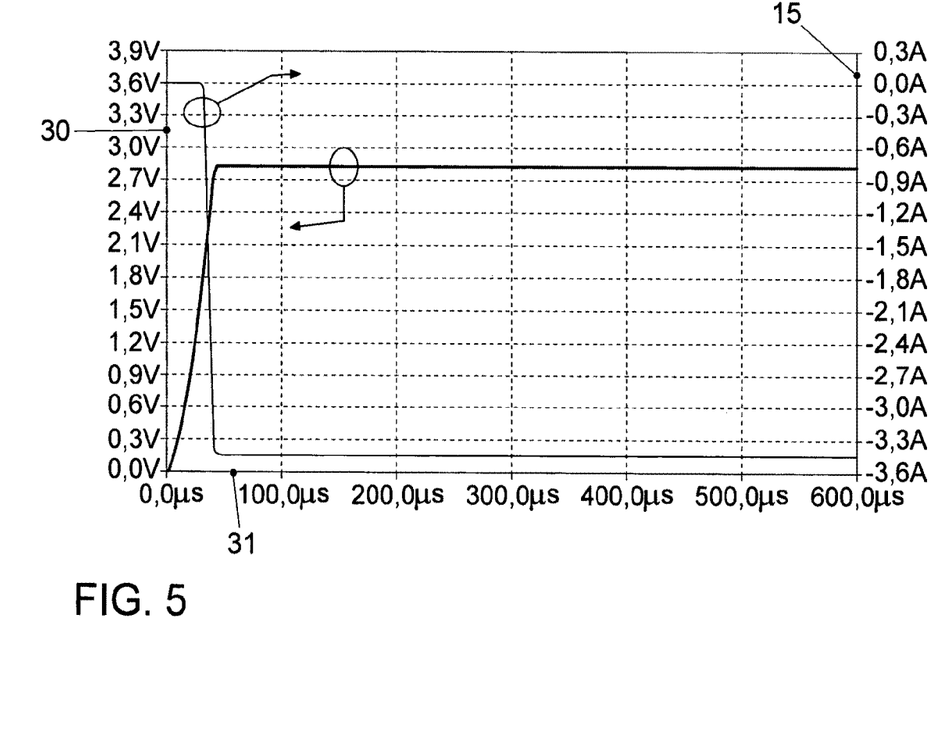
FIG. 5 shows a schematic illustration of a temporal curve of an activation voltage and a detonation current when using an inductive coupler with a ferrite ring core, according to some aspects of the present disclosure.

A schematic illustration of a temporal curve 31 for a control voltage 30 and a detonation voltage 1 when suing an inductive coupler with a ferrite ring core 19 (cf. FIG. 4) for an exemplary (secondary) inductance in the ferrite ring core of 6 μH is shown in FIG. 5, to clarify the present disclosure. This is based on an operating temperature for a high voltage battery connected to the busbar of −25° C. In this exemplary overview, a (primary) inductance in the busbar 4 or high voltage line 20 (cf. FIG. 4) of 10 nH and a coupling factor of k=0.71 is assumed. In this example, the capacitor 10 has a capacitance of 0.2 μF, and the resistance is 1 MΩ. By way of example, the IRFHS8242 25V Single N-Channel HEXFET Power MosFet semiconductor switch from Infineon AG can be used for the semiconductor switch. It can be seen in FIG. 5 that with these parameters, a control voltage 30 of ca. 2.8V can be supplied to the control input in the semiconductor switch by increasing the current through the busbar 4 to 350 A within less than 0.2 milliseconds. This results in an increase in the detonation current 15 to a value of >3.3 A. If a typical electro-pyrotechnical detonator is used (e.g., the "Pyro Safety Switch" from AutoLiv), the detonator is triggered with a detonation current 15 that is >1.75 A, which must be applied for a period of >0.5 milliseconds. The electrical fuse can also be triggered with the selected parameters for the ferrite ring core based on an increase in the current through the busbar 4 or high voltage line 20 (cf. FIG. 4) to 350 A within less than 0.2 milliseconds in the case of a malfunction at low temperatures of −25° C. in the high voltage battery.

The embodiments shown herein are to be understood merely as examples. For example with other requirements regarding an increasing (malfunction) current in the high voltage line 20, at which the electro-pyrotechnical detonator should be triggered, for example the dimensions and inductances, as well as the capacitance of the capacitor and the resistor, if applicable, the parameters may be different, or need to be adapted to the specific application.

Figure 6:
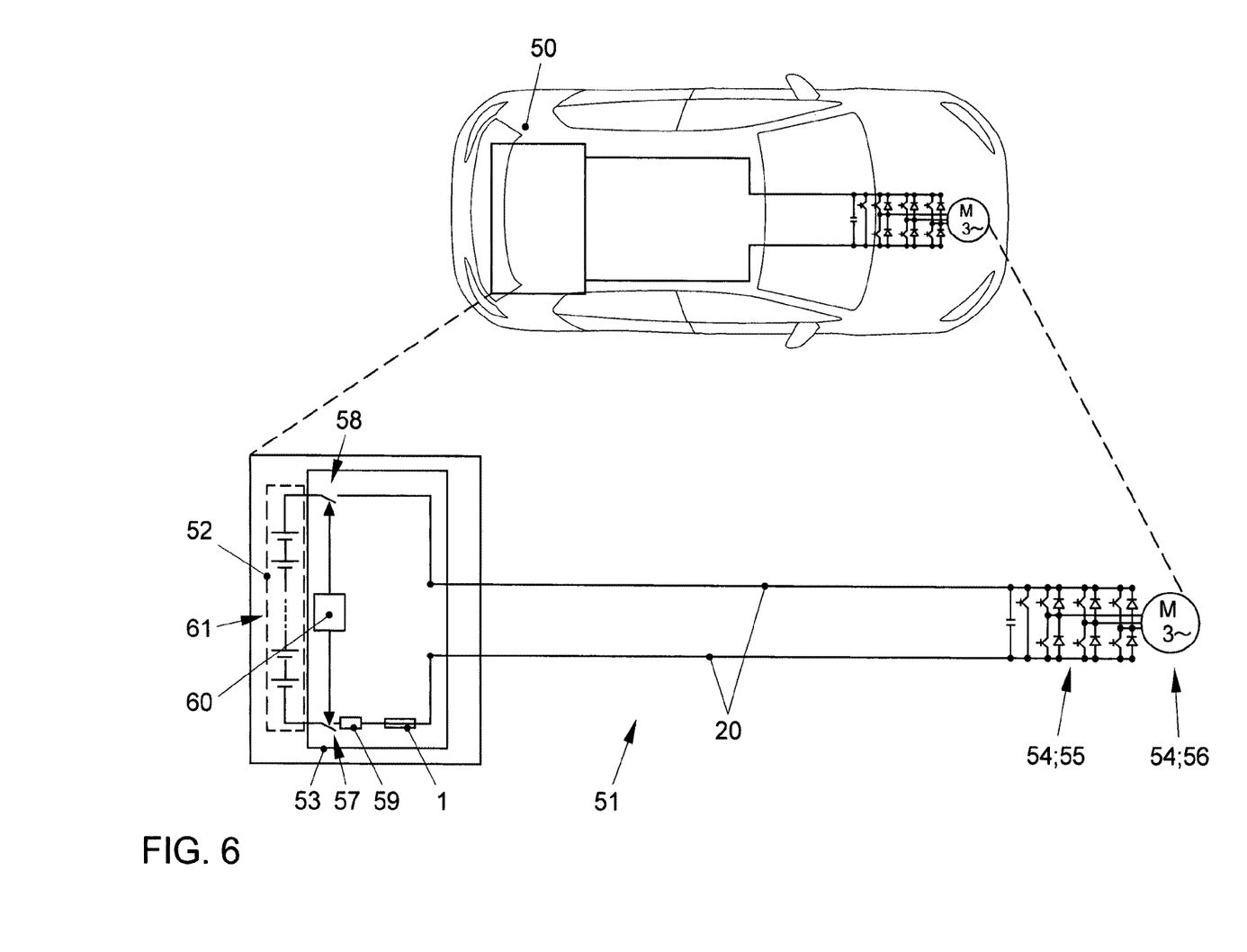
FIG. 6 shows a schematic illustration of an embodiment of an traction power network in a motor vehicle according to some aspects of the present disclosure.

A schematic illustration of an embodiment of a traction power network 51 in a motor vehicle is shown in FIG. 6. The traction power network 51 includes a high voltage power source 52, a connection unit 53, and high voltage components 54. The high voltage components 54 are an inverter 55 and an electric machine 56.

The connection unit 53 has two electromechanical breakers 57, 58, a current sensor 59, and a control unit 60.

When the battery is in operation (e.g., while the vehicle is underway, or the battery is being charged), an overloading of the battery cells 61 in the high voltage battery 52 and the breakers 57, 58 is prevented in that a maximum current is limited, wherein current boundary conditions are taken into account, e.g., the temperature of the battery cells 61. The control unit 60 detects a current flowing between the battery cells 62 and the electrical consumers, for example the electric machine 56 and the inverter 55 in the motor vehicle, via the current sensor 59 for this. If the maximum current is exceeded, the breakers 57, 58 are opened by the control unit 60 after a predefined plausibility check period. This prevents damage to the battery cells 61.

A fuse 1 according to the present disclosure also protects the battery cells 61 and the traction power network 51 from an overload. The inverter 55 and electric machine 56 are connected to the high voltage battery 52 via a high voltage line 20 for this, wherein the electrical fuse 1 protects the high voltage line 20.

The current circuit in the traction power network 51 can then be interrupted in the case of a malfunction, e.g., if there is a short circuit in the high voltage line 20 due to a defect or an accident, precisely at a defined threshold value for the current.

Figure 7:
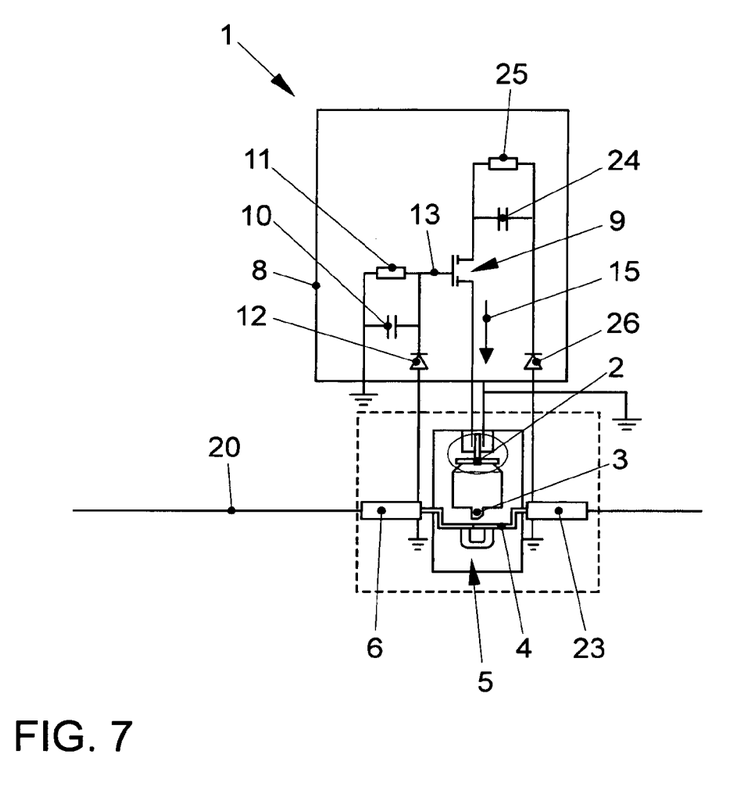
FIG. 7 shows a schematic illustration of another embodiment of the electrical fuse according to some aspects of the present disclosure.

A schematic illustration of another embodiment of the electrical fuse 1 is shown in FIG. 7. The electrical fuse 1 is constructed in principle like the embodiment shown in FIG. 1. The same reference symbols therefore indicate the same terms and features.

The electrical fuse 1 in this embodiment also has an additional inductive coupler 23 on the busbar 4. The control circuit 8 also has an additional capacitor 24, an additional resistor 25 connected in parallel to the additional capacitor 24, and an additional diode 26. The additional inductive coupler 23 and the additional capacitor 24 are selected herein and connected to one another and the semiconductor switch 9 such that the additional capacitor 24 can be charged via a current obtained at the additional inductive coupler 23 via the additional diode 26, and the detonation current 15 necessary for triggering the electro-pyrotechnical detonator 2 can be supplied via the additional charged capacitor 24. For example, due to the additional capacitor 24, there is no need for an external power source. With an exemplary detonation current 15 of >1.75 A, which must be applied to the electro-pyrotechnical detonator 2 for at least 0.5 milliseconds, an inductance of the additional inductive coupler 23 must be approx. 1,500 µH and a capacitance of the additional capacitor 24 must lie approx. in the range of 25 µF, in an embodiment that otherwise has the same properties as that shown in FIG. 1, in order to supply the detonation current 15 necessary for triggering the electro-pyrotechnical detonator 15 if the currents flowing through the busbar 4 increase to ~250-450 A in the case of a malfunction.

LIST OF REFERENCE SYMBOLS 1 electrical fuse
2 electro-pyrotechnical detonator
3 moving separating element
4 busbar
5 separating section
6 inductive coupler
8 control circuit
9 semiconductor switch
10 capacitor
11 resistor
12 diode
13 control input
14 voltage connection
15 detonation current
16 air coil
17 width
18 diameter
19 ferrite ring core
20 high voltage line
21 length
22 contact
23 additional inductive coupler
24 additional capacitor
25 additional resistor
26 additional diode
30 control voltage
31 temporal curve
50 motor vehicle
51 traction power network
52 high voltage power source
53 connection unit
54 high voltage components
55 inverter
56 electric machine
57 electromechanical breaker
58 electromechanical breaker
59 current sensor
60 control unit
61 battery cells

The invention claimed is:
1. An electrical fuse, comprising:
an electro-pyrotechnical detonator;
a separating element configured to be moved by the electro-pyrotechnical detonator;
a busbar comprising a separating section, wherein the separating element is configured in relation to the electro-pyrotechnical detonator and the separating section in the busbar such that the separating element moves after the electro-pyrotechnical detonator is triggered to sever the busbar;

at least one inductive coupler configured on the busbar or a high voltage line;

a control circuit for controlling a detonating current for triggering the electro-pyrotechnical detonator, wherein the control circuit comprises at least one semiconductor switch for switching the detonating current on, at least one capacitor coupled to a control input on the semiconductor switch, and a diode, wherein the diode is coupled at one side to the at least one inductive coupler, and at another side to the capacitor and the control input in the semiconductor switch.

2. The electrical fuse according to claim 1, further comprising a resistor coupled in parallel to the capacitor.

3. The electrical fuse according to claim 1, wherein an inductance in the at least one inductive coupler is configured on the basis of (i) a minimum current supplied by a high voltage power source and flowing through the busbar, and/or (ii) an increase to the minimum current.

4. The electrical fuse according to claim 1, wherein the at least one inductive coupler comprises at least one air coil.

5. The electrical fuse according to claim 1, wherein the at least one inductive coupler comprises at least one ferrite ring coil.

6. The electrical fuse according to claim 1, wherein the electrical fuse is configured as a pyro-element, in which the at least one inductive coupler and the control circuit are integrated.

7. The electrical fuse according to claim 1, further comprising:

an additional inductive coupler; and an additional capacitor configured on the busbar, wherein the additional inductive coupler and the additional capacitor are coupled to one another and the semiconductor switch, such that the additional capacitor can be charged via a current induced at the additional inductive coupler, and the detonating current for triggering the electro-pyrotechnical detonator can be supplied via the charged additional capacitor.

8. A method for operating an electrical fuse, comprising:

providing a detonating current for an electro-pyrotechnical detonator;

triggering the electro-pyrotechnical detonator;

moving a moving separating element via the triggered electro-pyrotechnical detonator; and separating a separating section on a busbar via the moving separating element, wherein the detonating current provided for triggering the electro-pyrotechnical detonator is controlled via a semiconductor switch, wherein the semiconductor switch is controlled via a capacitor in the control circuit at a control input in the semiconductor switch, and wherein the capacitor is charged via a diode via at least one inductive coupler configured on the busbar or a high voltage line.

9. The method according to claim 8, wherein the detonating current is provided by via an additional inductive coupler and an additional capacitor located on the busbar, wherein the additional coupler and additional capacitor are coupled to one another and the semiconductor switch such that the additional capacitor is charged by a current induced at the additional inductive coupler, and the detonating current for triggering the electro-pyrotechnical detonator is supplied by the charged additional capacitor.

10. The method according to claim 8, wherein an inductance in the at least one inductive coupler is configured on the basis of (i) a minimum current supplied by a high voltage power source and flowing through the busbar, and/or (ii) an increase to the minimum current.

11. The method according to claim 8, wherein the at least one inductive coupler comprises at least one air coil.

12. The method according to claim 8, wherein the at least one inductive coupler comprises at least one ferrite ring coil.

13. The method according to claim 8, wherein the electrical fuse is configured as a pyro-element, in which the at least one inductive coupler and the control circuit are integrated.

14. An electrical fuse, comprising:

an electro-pyrotechnical detonator;

a separating element configured to be moved by the electro-pyrotechnical detonator;

a busbar comprising a separating section, wherein the separating element is configured in relation to the electro-pyrotechnical detonator and the separating section in the busbar such that the separating element moves after the electro-pyrotechnical detonator is triggered to sever the busbar;

at least one inductive coupler configured on the busbar or a high voltage line; and a control circuit for controlling a detonating current for triggering the electro-pyrotechnical detonator, wherein the control circuit comprises at least one semiconductor switch for switching the detonating current on, at least one capacitor coupled to a control input on the semiconductor switch, and a diode, wherein the diode is coupled at one side to the at least one inductive coupler, and at another side to the capacitor and the control input in the semiconductor switch, wherein an inductance in the at least one inductive coupler is configured on the basis of (i) a minimum current supplied by a high voltage power source and flowing through the busbar, and/or (ii) an increase to the minimum current.

15. The electrical fuse according to claim 14, further comprising a resistor coupled in parallel to the capacitor.

16. The electrical fuse according to claim 14, wherein the at least one inductive coupler comprises at least one air coil.

17. The electrical fuse according to claim 14, wherein the at least one inductive coupler comprises at least one ferrite ring coil.

18. The electrical fuse according to claim 14, wherein the electrical fuse is configured as a pyro-element, in which the at least one inductive coupler and the control circuit are integrated.

* * * * *